(12) United States Patent
Saleh et al.

(10) Patent No.: US 11,790,593 B2
(45) Date of Patent: Oct. 17, 2023

(54) RAY-TRACING MULTI-SAMPLE ANTI-ALIASING

(71) Applicant: Advanced Micro Devices, Inc., Santa Clara, CA (US)

(72) Inventors: Skyler Jonathon Saleh, San Diego, CA (US); Chen Huang, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/819,008

(22) Filed: Mar. 13, 2020

(65) Prior Publication Data

US 2021/0287421 A1 Sep. 16, 2021

(51) Int. Cl.
| | |
|---|---|
| *G06T 15/06* | (2011.01) |
| *G06T 1/20* | (2006.01) |
| *G06T 15/00* | (2011.01) |
| *G06T 17/10* | (2006.01) |
| *G06T 15/50* | (2011.01) |

(52) U.S. Cl.
CPC .............. *G06T 15/06* (2013.01); *G06T 1/20* (2013.01); *G06T 15/005* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 5,461,706 A * | 10/1995 | Trow | G06T 15/83 345/585 |
| 9,619,921 B2 | 4/2017 | Lee et al. | |
| 2006/0077209 A1* | 4/2006 | Bastos | G06T 3/40 345/614 |
| 2015/0138228 A1* | 5/2015 | Lum | G06T 15/503 345/611 |
| 2017/0270146 A1 | 9/2017 | Harrison et al. | |
| 2018/0293782 A1 | 10/2018 | Benthin et al. | |
| 2018/0373809 A1* | 12/2018 | Ylitie | G06T 15/06 |
| 2019/0057539 A1 | 2/2019 | Stanard et al. | |

(Continued)

FOREIGN PATENT DOCUMENTS

KR 10-2015-0045817 A 4/2015

OTHER PUBLICATIONS

Ingo Wald, Solomon Boulos, Peter Shirley, "Ray Tracing Deformable Scenes using Dynamic Bounding Volume Hierarchies," 2007, ACM Transactions on Graphics 26(1):Article 6 (Year: 2007).*

(Continued)

*Primary Examiner* — Michael J Cobb
(74) *Attorney, Agent, or Firm* — Volpe Koenig

(57) ABSTRACT

A technique for performing a ray tracing operation for a ray is provided. The method includes performing one or more ray-box intersection tests for the ray against one or more bounding boxes of a bounding volume hierarchy to eliminate one or more nodes of the bounding volume hierarchy from consideration, for one or more triangles of the bounding volume hierarchy that are not eliminated by the one or more ray-box intersection tests, performing one or more ray-triangle intersection tests utilizing samples displaced from a centroid position of the ray, and invoking one or more shaders of a ray tracing pipeline for the samples based on results of the ray-triangle intersection tests.

22 Claims, 8 Drawing Sheets

(56) References Cited

U.S. PATENT DOCUMENTS

| | | | |
|---|---|---|---|
| 2019/0197761 A1 | 6/2019 | Saleh et al. | |
| 2020/0279379 A1* | 9/2020 | Hog | G06T 7/11 |
| 2020/0320776 A1* | 10/2020 | Doyle | G06T 9/001 |
| 2021/0287421 A1* | 9/2021 | Saleh | G06T 17/10 |
| 2021/0407183 A1* | 12/2021 | Guo | G09G 5/363 |
| 2023/0109412 A1* | 4/2023 | Gruen | G06T 15/506 |
| | | | 345/426 |

OTHER PUBLICATIONS

M. McGuire, E. Enderton, P. Shirley, and D. Luebke, "Real-Time Stochastic Rasterization on Conventional GPU Architectures," 2010, High Performance Graphics pp. 173-182 (Year: 2010).*

OpenGL "GLSL: Center or Centroid? (Or When Shaders Attack!)", The OPENGL Pipeline Newsletter—vol. 3, pp. 7-10, retrieved from "https://www.opengl.org/pipeline/article/vol003_6/" (Year: 2007).*

Stich, M., "Introduction to NVIDIA RTX and DirectX Ray Tracing," NVIDIA Developer Blog, https://devblogs.nvidia.com/introduction-nvidia-rtx-directx-ray-tracing/, Mar. 19, 2018 (Retrieved Mar. 13, 2020).

Owen, G. Scott," Ray—Box Intersection", https://education.siggraph.org/static/HyperGraph/raytrace/rtinter3.htm, Apr. 1, 1998 (Retrieved Mar. 13, 2020).

Hunt, W., "Real-Time Ray Casting for Virtual Reality", https://www.highperformancegraphics.org/wp-content/uploads/2017/Hot3D/HPG2017_RealTimeRayCasting.pdf, 29 pages (Retrieved Mar. 11, 2020).

Hunt, W., et. al., "Hierarchical Visibility for Virtual Reality", Proceedings of the ACM on Computer Graphics and Interactive Techniques, vol. 1, No. 1, Article 8, 18 pgs., May 2018.

* cited by examiner

RAY-TRACING MULTI-SAMPLE ANTI-ALIASING

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing a ray tracing operation for a ray is provided. The method includes performing one or more ray-box intersection tests for the ray against one or more bounding boxes of a bounding volume hierarchy to eliminate one or more nodes of the bounding volume hierarchy from consideration, for one or more triangles of the bounding volume hierarchy that are not eliminated by the one or more ray-box intersection tests, performing one or more ray-triangle intersection tests utilizing samples displaced from a centroid position of the ray, and invoking one or more shaders of a ray tracing pipeline for the samples based on results of the ray-triangle intersection tests.

Figure 1:
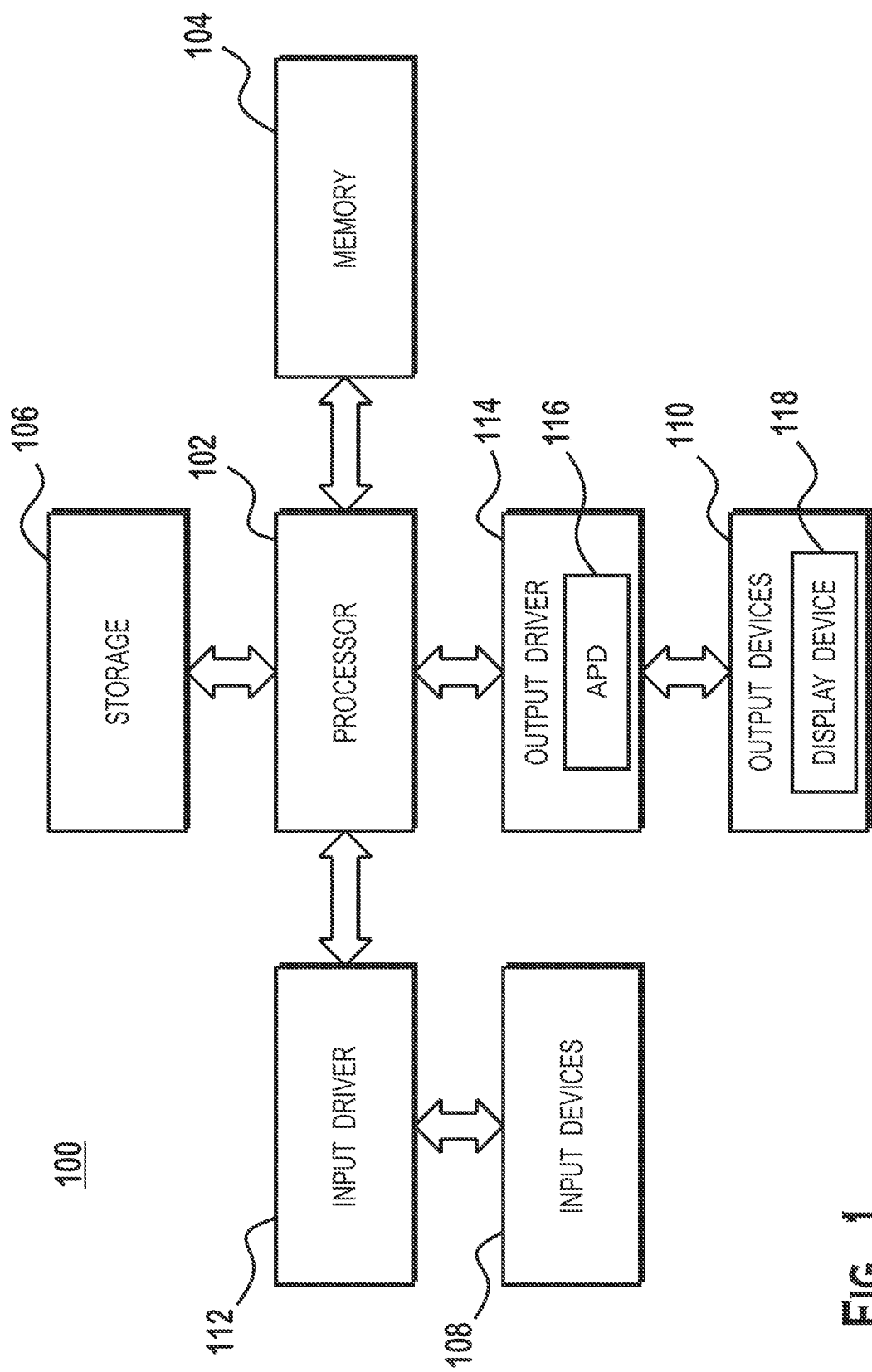
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
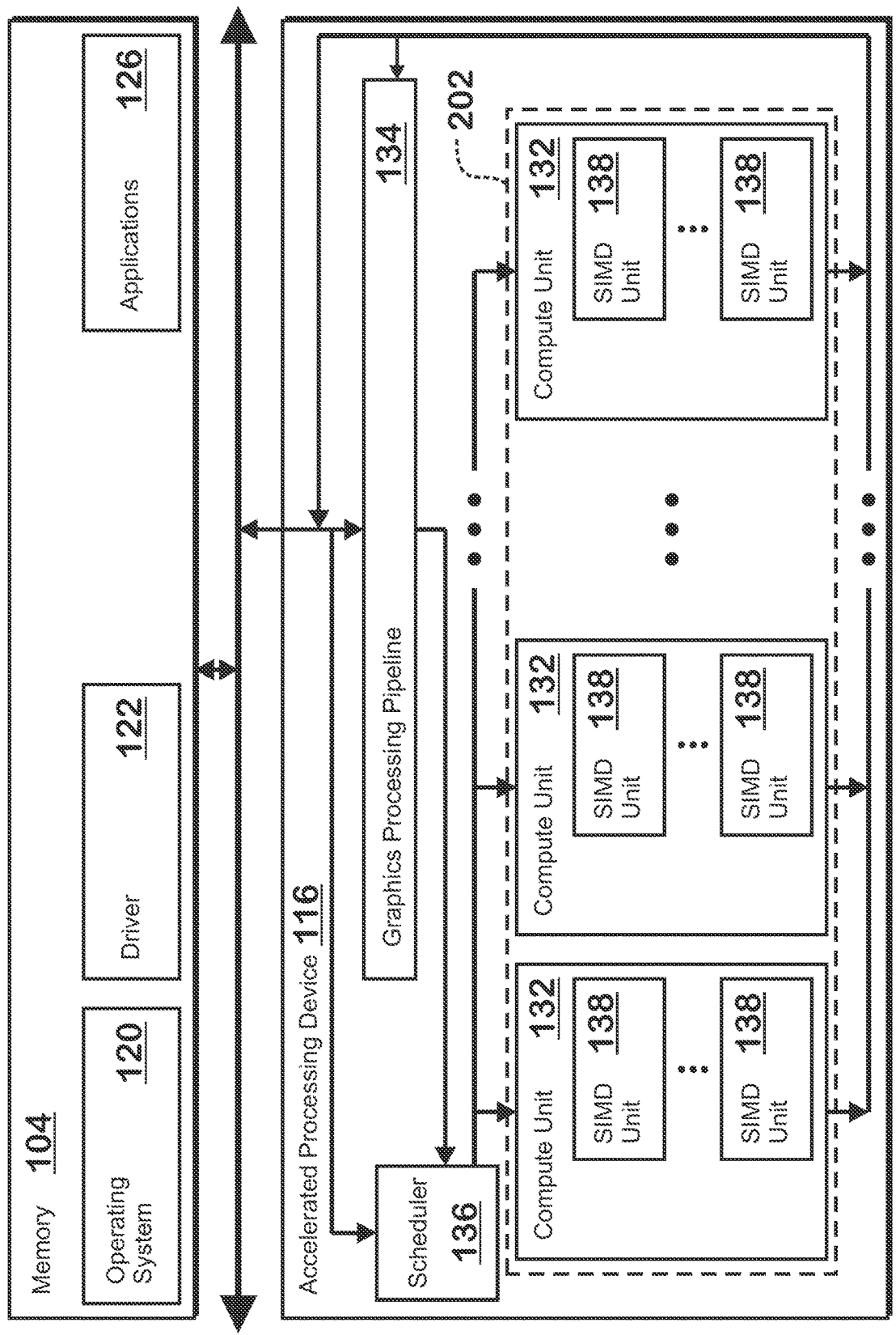
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
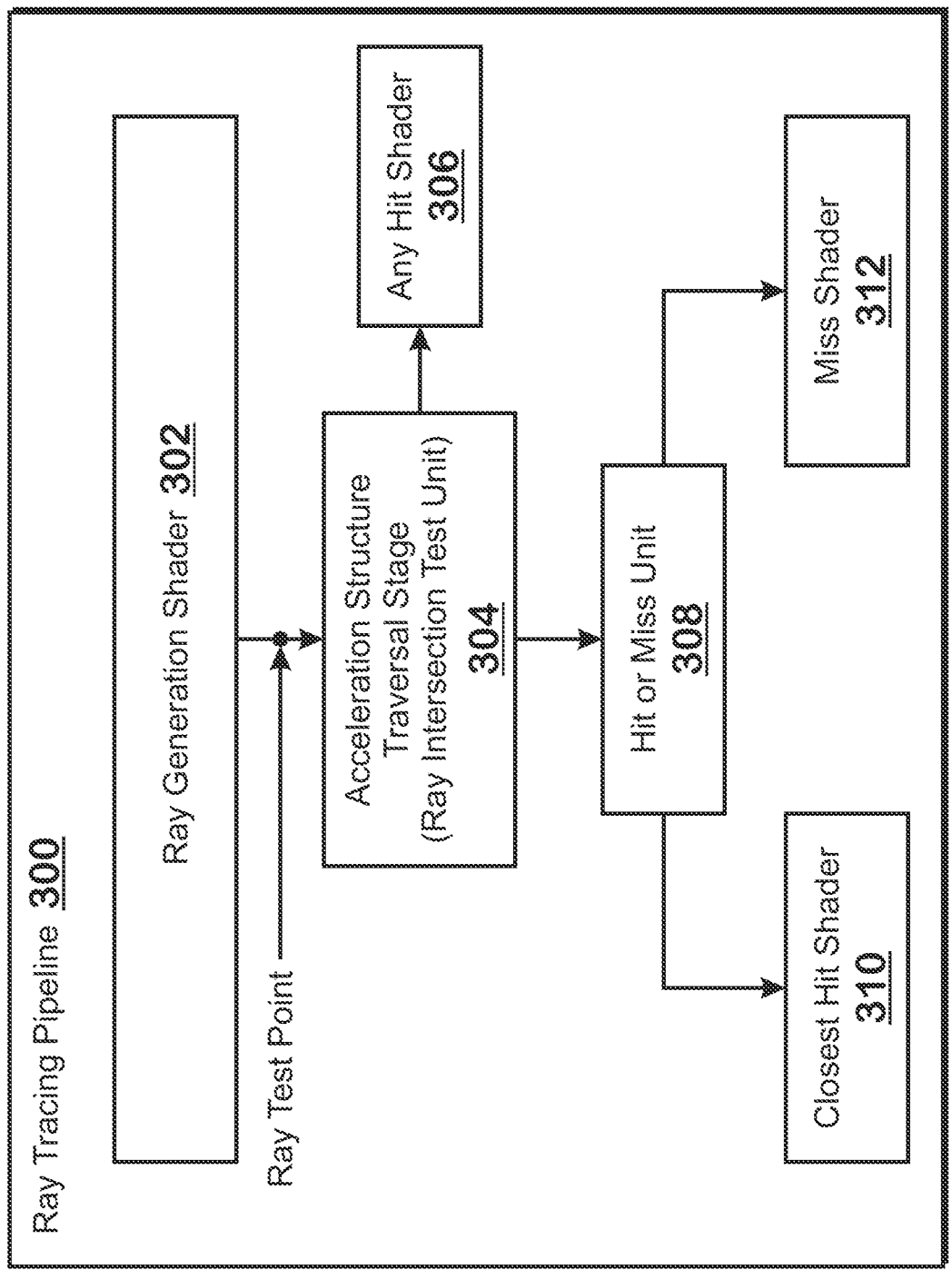
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs a ray intersection test to determine whether a ray hits a triangle.

The ray tracing pipeline 300 indicates the path through which a ray tracing operation flows. To render a scene using ray tracing, a rendering orchestrator such as a program executing on the processor 102 designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image, and requesting rays be traced from the camera through the image. The ray tracing pipeline 300 performs the various operations described herein to determine colors for the rays. Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 is, in various implementations, orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is performed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers performance of the any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers performance of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the closest hit shader 310 and miss shader 312 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray generation shader 302 generates rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
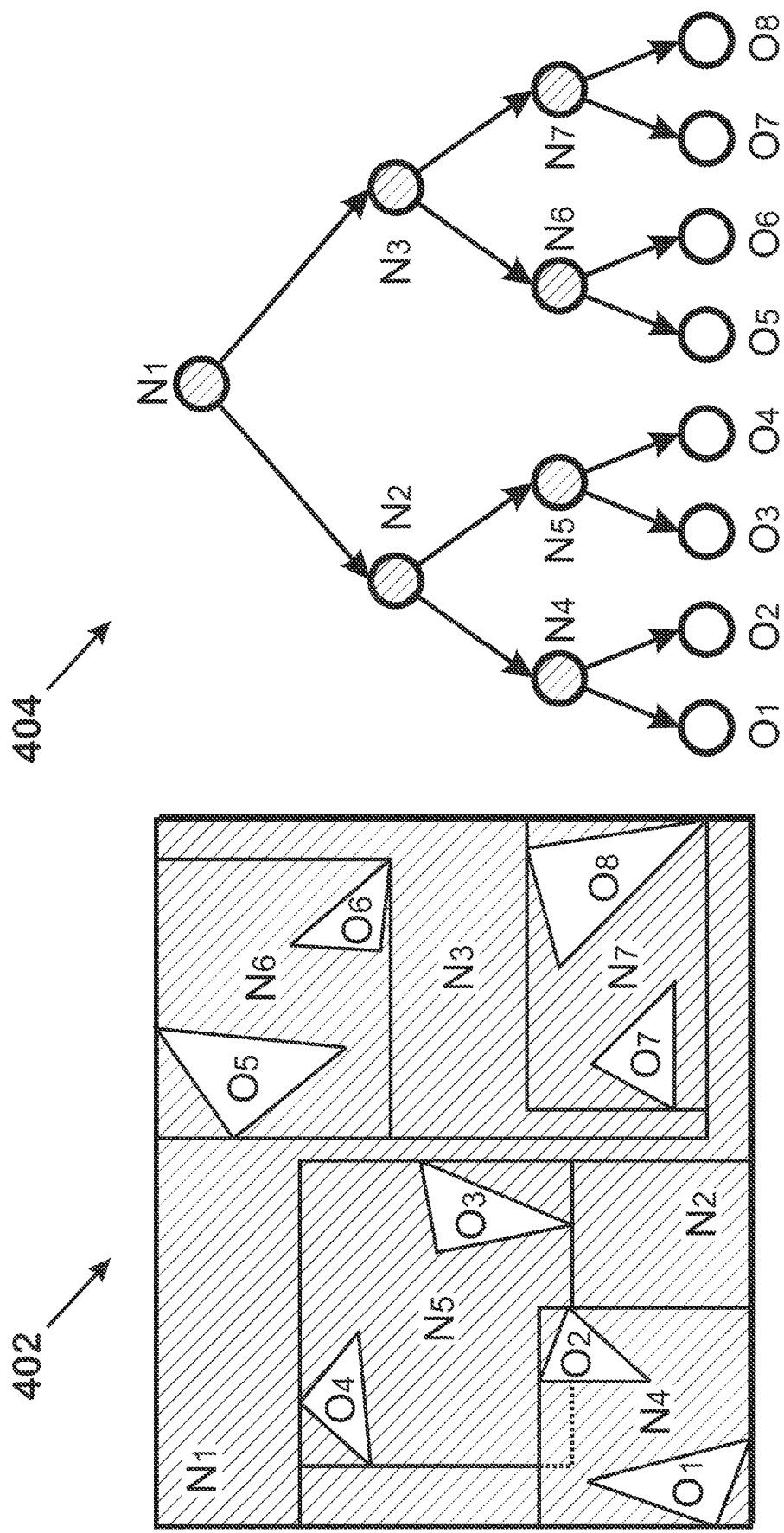
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray-triangle test involves asking whether the ray hits the triangle and also the time to hit the triangle (time from ray origin to point of intersection). Conceptually, the ray-triangle test involves projecting the triangle into the viewspace of the ray so that it is possible to perform a simpler test similar to testing for coverage in two dimensional rasterization of a triangle as is commonly performed in graphics processing pipelines. More specifically, projecting the triangle into the viewspace of the ray transforms the coordinate system so that the ray points downwards in the z direction and the x and y components of the ray are 0 (although in some modifications, the ray may point upwards in the z direction, or in the positive or negative x or y directions, with the components in the other two axes being zero). The vertices of the triangle are transformed into this coordinate system. Such a transform allows the test for intersection to be made by simply asking whether the x, y coordinates of the ray fall within the triangle defined by the x, y coordinates of the vertices of the triangle, which is the rasterization operation described above.

Figure 5:
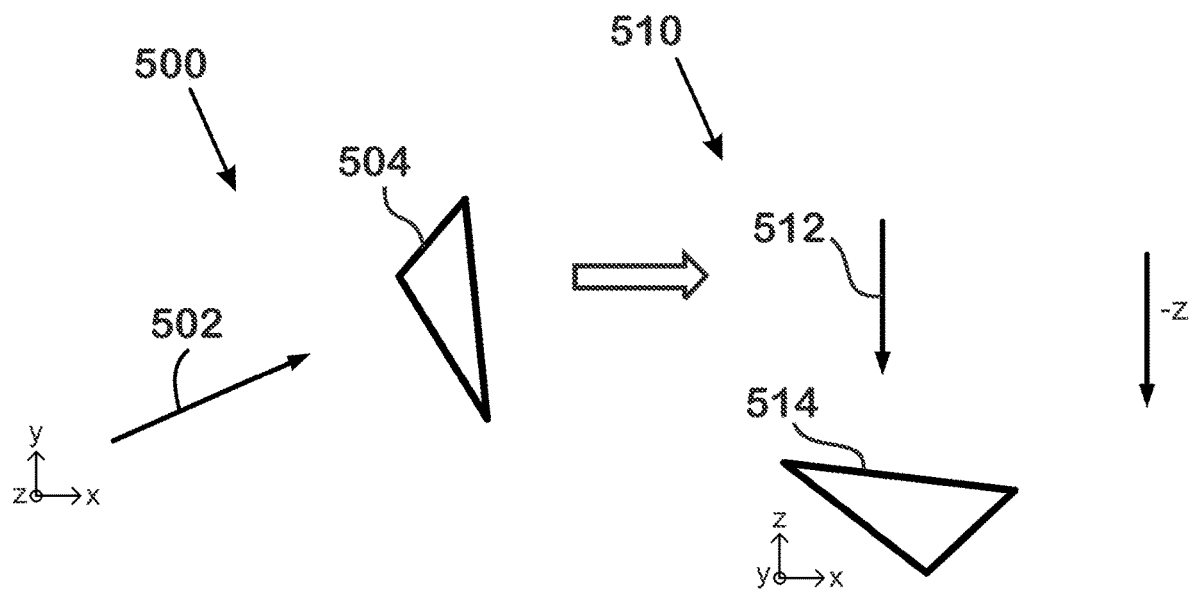
FIG. 5 illustrates a coordinate transform for performing a ray-triangle intersection test, according to an example.

This transformation is illustrated in FIG. 5. The ray 502 and triangle 504 are shown in coordinate system 500 before the transformation. In the transformed coordinate system 510 coordinate system, the ray 512 is shown pointing in the −z direction and the triangle 514 is shown in that coordinate system 510 as well.

Figure 6:
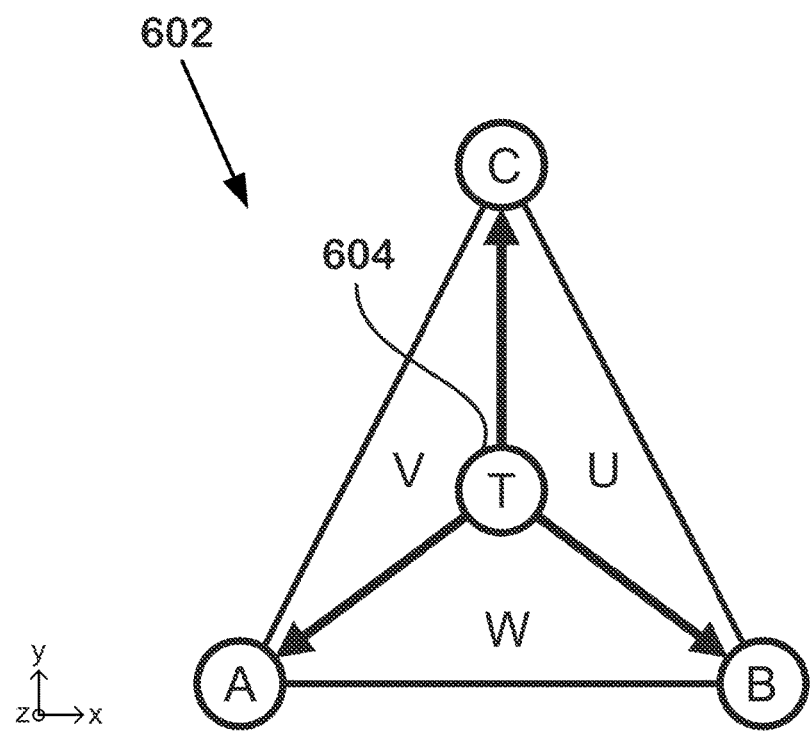
FIG. 6 illustrates the ray-triangle intersection test as a rasterization operation, according to an example.

FIG. 6 illustrates the ray intersection test as a rasterization operation. Specifically, vertices A, B, and C define the triangle 514 and vertex T is the origin of the ray 512. Testing for whether the ray 512 intersects the triangle 514 is performed by testing whether vertex T is within triangle ABC. This will be described in further detail below.

Additional details of the ray-triangle test are now provided. First, the coordinate system is rotated so that the z-axis is the dominant axis of the ray (where "dominant axis" means the axis that the ray travels the quickest in). This rotation is done to avoid some edge cases when the z component of the ray direction is 0 and the poorer numerical stability that occurs when the z component of the ray direction is small. The coordinate system rotation is performed in the following manner. Note that this coordinate system rotation is optional.

First, note the ray is defined by both an origin and a direction. The origin is the starting point of the ray and the direction indicates the directional extent of the ray. The largest dimension (x, y, or z) of the ray is determined. The largest dimension is the dimension whose magnitude is the largest. More specifically, the ray has three components: x, y, and z, which define of the ray. The largest of the absolute values of these components is considered to be the largest dimension.

With the largest dimension determined, the ray is rotated so that the largest dimension of the ray is pointing in the z direction. If the largest dimension is z, then the ray does not change. If the largest dimension is x, then the ray is rotated by setting the x dimension to the old y dimension, the y dimension to the old z dimension, and the z dimension to the old x dimension. If the largest dimension is y, then the ray is rotated by setting the x dimension to the old z dimension, the y dimension to the old x dimension, and the z dimension to the old y dimension. Because a ray is defined by both origin and direction, the origin is rotated in a similar manner as with the direction vector. In addition, the vertices of the triangle (shown as A, B, and C in FIG. 6) are rotated in the same way that the vertices of the ray are rotated.

In the next step, the vertices of the triangle are translated to be relative to the origin of the ray. More specifically, a translated A vertex is determined by subtracting the ray origin from the old A vertex. A translated B vertex is determined by subtracting the ray origin from the old B vertex. A translated C vertex is determined by subtracting the ray origin from the old C vertex. The translated A, B, and C vertices are referred to herein as $A_{tr}$, $B_{tr}$, and $C_{tr}$, respectively. The ray origin is now set to <0,0,0>. It should be understood that the ray direction is relative to the ray origin.

Next, to simplify the calculation of the intersection between the ray and the triangle, a linear transformation is applied to the ray and the vertices of the triangle to allow the test to be performed in two dimensions rather than three. This linear transformation is done by multiplying each of the vertices of the triangle by the transformation matrix M. The ray direction does not need to be explicitly transformed by matrix M because matrix M is constructed such that the transformed ray direction will always be <0, 0, ray_dir.z>. The ray direction can be transformed like this because the ray origin is at <0,0,0> due to the above translation step. Note, ray_dir.z is the z component of the rotated ray direction, ray_dir.x is the x component of the rotated ray direction, and ray_dir.y is the y component of the rotated ray direction. The ray origin does not need to be transformed because the ray origin is <0,0,0>. Matrix M is the following:

$$M = \begin{bmatrix} \text{ray\_dir}.z & 0.0 & -\text{ray\_dir}.x \\ 0.0 & \text{ray\_dir}.z & -\text{ray\_dir}.y \\ 0.0 & 0.0 & 1.0 \end{bmatrix}$$

The matrix multiplication occurs by multiplying the translated, rotated vertices of triangle ($A_{tr}$, $B_{tr}$, and $C_{tr}$) by the matrix M, to generate new vertices for the triangle $A_{trf}$, $B_{trf}$, and $C_{trf}$ as follows. Note, components of a particular vertex are indicated with the subscript suffix -x, -y, or -z.

$A_{trf\text{-}x} = A_{tr\text{-}x} * \text{ray\_dir}.z - \text{ray\_dir}.x * A_{tr\text{-}z}$ $A_{trf\text{-}y} = A_{tr\text{-}y} * \text{ray\_dir}.z - \text{ray\_dir}.y * A_{tr\text{-}z}$ $A_{trf\text{-}z} = A_{tr\text{-}z}$ $B_{trf\text{-}x} = B_{tr\text{-}x} * \text{ray\_dir}.z - \text{ray\_dir}.x * B_{tr\text{-}z}$ $B_{trf\text{-}y} = B_{tr\text{-}y} * \text{ray\_dir}.z - \text{ray\_dir}.y * B_{tr\text{-}z}$ $B_{trf\text{-}z} = B_{tr\text{-}z}$ $C_{trf\text{-}x} = C_{tr\text{-}x} * \text{ray\_dir}.z - \text{ray\_dir}.x * C_{tr\text{-}z}$ $C_{trf\text{-}y} = C_{tr\text{-}y} * \text{ray\_dir}.z - \text{ray\_dir}.y * C_{tr\text{-}z}$ $C_{trf\text{-}z} = C_{tr\text{-}z}$ Conceptually, the matrix M scales and shears the coordinates such that the ray direction only has a z component of magnitude ray_dir.z. With the vertices transformed in the above manner, the ray-triangle test is performed as the 2D rasterization test. FIG. 6 illustrates a triangle 602 having vertices A, B, and C, corresponding to the $A_{trf}$, $B_{trf}$ and $C_{trf}$ described above. The ray 604 is shown as point T. Because of the transformations performed on the vertices and the ray, the ray is pointing in the −z direction. In addition, because the triangle is projected onto the coordinate system in which the ray points in the −z direction, the triangle-ray test is reformulated as a test for whether the origin of the ray is within the triangle defined by the x, y coordinates of the vertices A, B, and C. In other words, the 3-dimensional test of whether the ray intersects the triangle has been converted into a 2-dimensional test of whether the origin of the ray is within a triangle. In addition, because of the above transformations: the ray origin is at 2D point (0,0); the point of intersection between the ray and the triangle (T) is also at 2D point (0,0); and the distances between the vertices of the triangle, which are A-T for vertex A, B-T for vertex B, and C-T for vertex C, are simply A, B, and C because the point of intersection between the ray and the triangle is at (0,0).

Next, barycentric coordinates for the triangle, U, V, W (shown in FIG. 6) are calculated in the following manner:

$U = \text{area}(\text{Triangle } CBT) = 0.5 * (C \times B)$ $V = \text{area}(\text{Triangle } ACT) = 0.5 * (A \times C)$ $W = \text{area}(\text{Triangle } BAT) = 0.5 * (B \times A)$ Here, the "x" indicates a cross-product and A, B, and C are the transformed vertices $A_{trf}$, $B_{trf}$, and $C_{trf}$, which are shown in FIG. 6. The signs of U, V, and W indicate whether the ray intersects the triangle. More specifically, if U, V, and W are all positive, or if U, V, and W are all negative, then the ray is considered to intersect the triangle because the point T is inside the triangle in FIG. 6. If the signs of U, V, and W are different, then the ray does not intersect the triangle because the point T is outside of the triangle. If exactly one of U, V, and W is zero, then the point T lies on the line that runs through the edge corresponding to that coordinate. In this situation, the point T is on an edge of the triangle 602 if the signs of the other two coordinates are the same, but if the signs of the other two coordinates are different, then the point is not on an edge of the triangle. If exactly two of U, V, and W are zero, then the point T is considered to be on a corner of the triangle. If all of U, V, and W are zero, then the triangle is a zero area triangle. One additional point is that point T may be inside the triangle in 2D (indicated as the ray intersecting the triangle above) but may still miss the triangle in 3D space if the ray is behind the triangle. The sign of t, described below, indicates whether the ray is behind (and thus does not intersect) the triangle. Specifically, if the sign is negative, the ray is behind the triangle and does not intersect the triangle. If the sign is positive or 0, then the ray intersects the triangle.

In various implementations, any of the situations where the point is on an edge or a corner, or in the situation where the triangle is a zero area triangle, may be considered either a hit or a miss. In other words, the determination of whether the point lying on an edge is a hit or a miss, and/or the determination of whether the point lying on a corner is a hit or a miss, is dependent on a specific policy. For example, in some implementations, all instances where the point lies on an edge or a corner are considered to be hits. In other implementations, all such instances are considered to be misses. In yet other implementations, some such instances (such as the point T lying on edges facing in specific directions) are considered hits while other such instances are considered misses.

In addition, the time t at which the ray hits the triangle is determined. This is done using the barycentric coordinates of the triangle (U, V, and W) already calculated, by interpolating the Z value of all of the triangle vertices. First, the z component of point T (the intersection point of the ray with the triangle) is calculated:

$$T \cdot z = \frac{U*Az + V*Bz + W*Cz}{U+V+W}$$

where Az is the z component of vector A, Bz is the z component of vector B, Cz is the z component of vector C, and U, V, and W are the barycentric coordinates calculated above. (A, B, and C are the same as $A_{trf}$, $B_{trf}$, and $C_{trf}$ above). T.x and T.y are zero, and thus T is (0, 0, T.z). The time t is calculated as follows:

$$t = \frac{\text{distance(ray\_origin}, T)}{\text{length(ray\_dir)}} = \frac{\text{length}(T)}{\text{length(ray\_dir)}} = \frac{T \cdot z}{\text{ray\_dir} \cdot z}$$

where distance( ) represents the distance between two points, length( ) represents the length of a vector. The final expression for time of intersection t is as follows:

$$t = \frac{U*Az + V*Bz + W*Cz}{(U+V+W)*\text{ray\_dir} \cdot z}$$

Note that although the above-described steps are performed such that the ray points in a −z direction, this direction is arbitrary and the steps are of course symmetric with respect to any particular direction for ray pointing.

As described above, traversal through the BVH, and using the ray-triangle intersection test described above provides information regarding whether a ray hits a triangle and which one or more triangles are hit by the ray. In one mode of operation, a single sample is tested per ray. However, efficiency is gained by modifying the techniques described herein to allow for multiple sample tests per individual ray cast.

Figure 7:
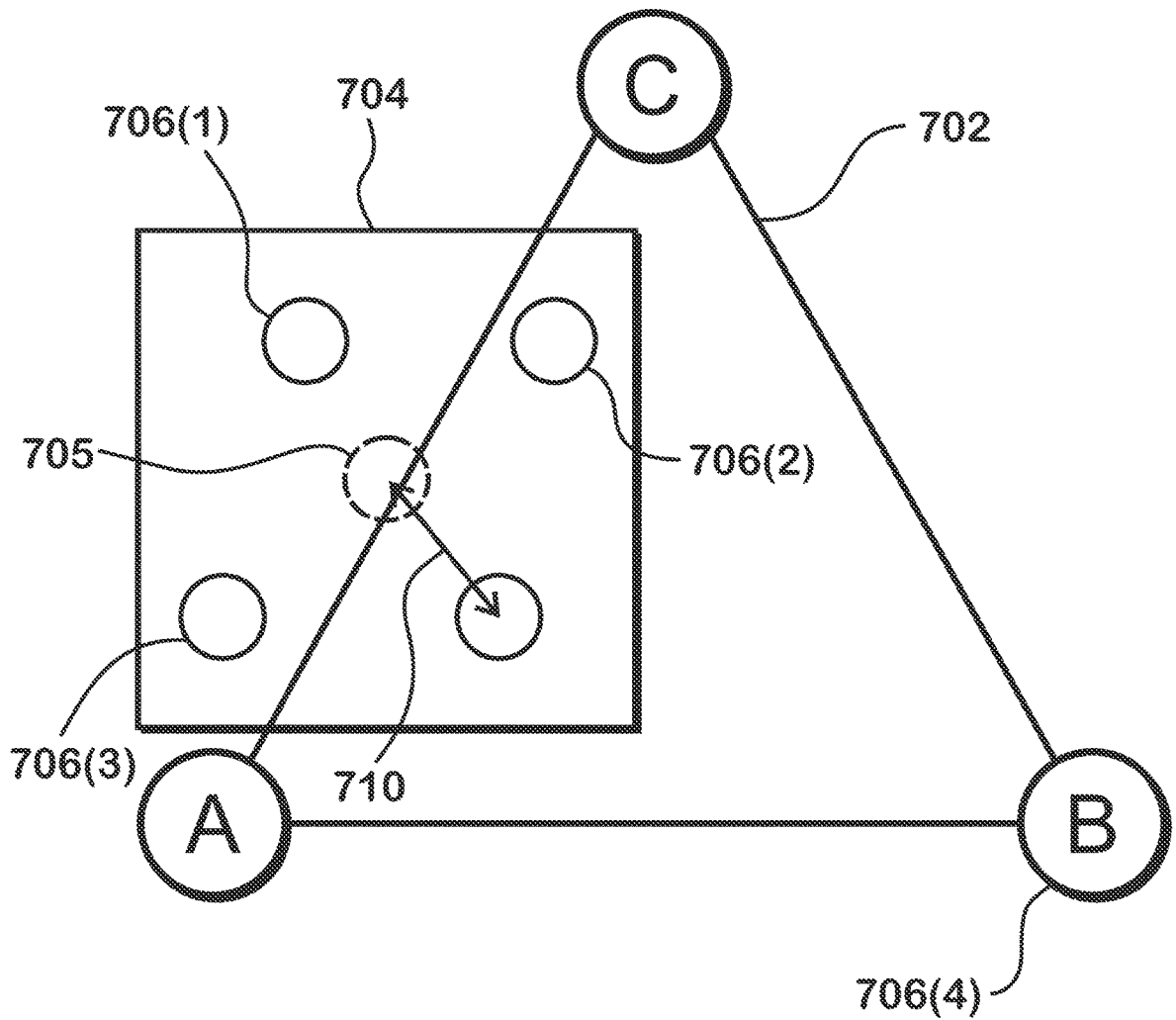
FIG. 7 illustrates a technique for performing multi-sample anti-aliasing with ray tracing, according to an example.

FIG. 7 illustrates a technique for performing multi-sample anti-aliasing with ray tracing, according to an example. According to this technique, a ray-triangle intersection test is performed as described with respect to FIGS. 5 and 6 up to the point that matrix M is multiplied by the vertices of the triangle. At this point, the pixel centroid 705 is located in two-dimensional space relative to the vertices of the triangle as illustrated in FIG. 7. To obtain multiple sample results, multiple samples 706 are generated by adding a sample offset values to the coordinates of the centroid 705. As the centroid position is at <0,0> in this coordinate space, the positions of the samples 706 are based on the offsets of the samples 706. With the positions of the samples 706 obtained in this coordinate space, a hit detection is obtained for each sample 706 by determining whether the sample 706 is within the triangle. In one example, a similar technique to the one described with respect to FIG. 6 is used. Specifically, barycentric coordinates are obtained as the areas of the triangles that the samples form with the vertices of the transformed triangle 702, and the signs of the barycentric coordinates are used to determine whether the samples 706 are within the triangle. Because the sample positions are not at <0,0> in the illustrated coordinate system, in one example, instead of setting the sample positions to be at non-zero coordinates, a translation is applied to each vertex of the triangle 702, where the translation is equal to the negative of the distance between the sample position and the centroid position. This allows the sample position back to be at <0,0>, which allows the formulas for U, V, and W described above to be used to calculate the barycentric coordinates.

In sum, hit results for multiple samples are obtained for each ray-triangle intersection test by performing the ray-triangle intersection test steps described above up to the point of multiplying the matrix M by the vertices of the triangle, generating multiple samples as offsets from the centroid of the pixel (or equivalently, translating the triangle vertices by the negative of the sample offsets), and determining whether these samples are within the triangle (which in some implementations is done using the signs of calculated barycentric coordinates described above).

In another example technique, for the triangle test (but not the box test), the whole triangle test is performed for each sample. For each such test, at the beginning of the test, the origin of each ray is offset by an amount in world space that results in the sample hitting a plane that is in the same plane as the triangle being tested against at a point that is offset from where the centroid ray would hit that plane by the scaled sample distance 710. In other words, for each ray for which multiple samples are to be tested against the triangle, the entire triangle test is performed, where the ray to be tested is offset such that the ray would hit the triangle at the correct sample position (if the ray indeed hits the triangle). In this example, the triangle test is performed for each such ray but in the BVH traversal, the box test is performed for only the centroid ray as described elsewhere herein.

FIG. 7 illustrates a pixel projection area 704. This pixel projection area 704 is the projection of the pixel on the triangle 702. The size of this projection increases with the distance from the camera. Thus, the offset values used to generate the locations for the samples are scaled based on a factor that is proportional to the distance of the triangle 702 to the camera. A scaled offset 710 is illustrated in FIG. 7 as an example. In some implementations, the scaling factor is t, described above, or is a value that is proportional to t. In general, the offset values used to generate the locations for the samples may be applied to either the final centroid position on the triangle itself, or at the origin of the ray, and the offsets may be applied either to the centroid ray or to the triangle vertices.

As described elsewhere herein, during BVH traversal, a determination that a ray does not intersect with a bounding box (non-leaf node) eliminates from consideration nodes that are descendants of that bounding box. For multi-sampled anti-aliasing using the techniques described herein, it is possible for the centroid ray that is cast to fall outside the bounding box of a triangle even where a sample that is generated as an offset to the centroid position actually intersects that triangle. For this reason, bounding boxes are scaled by a scale factor that is dependent on the projected pixel area of the pixel on the bounding box during box tests.

Figure 8:
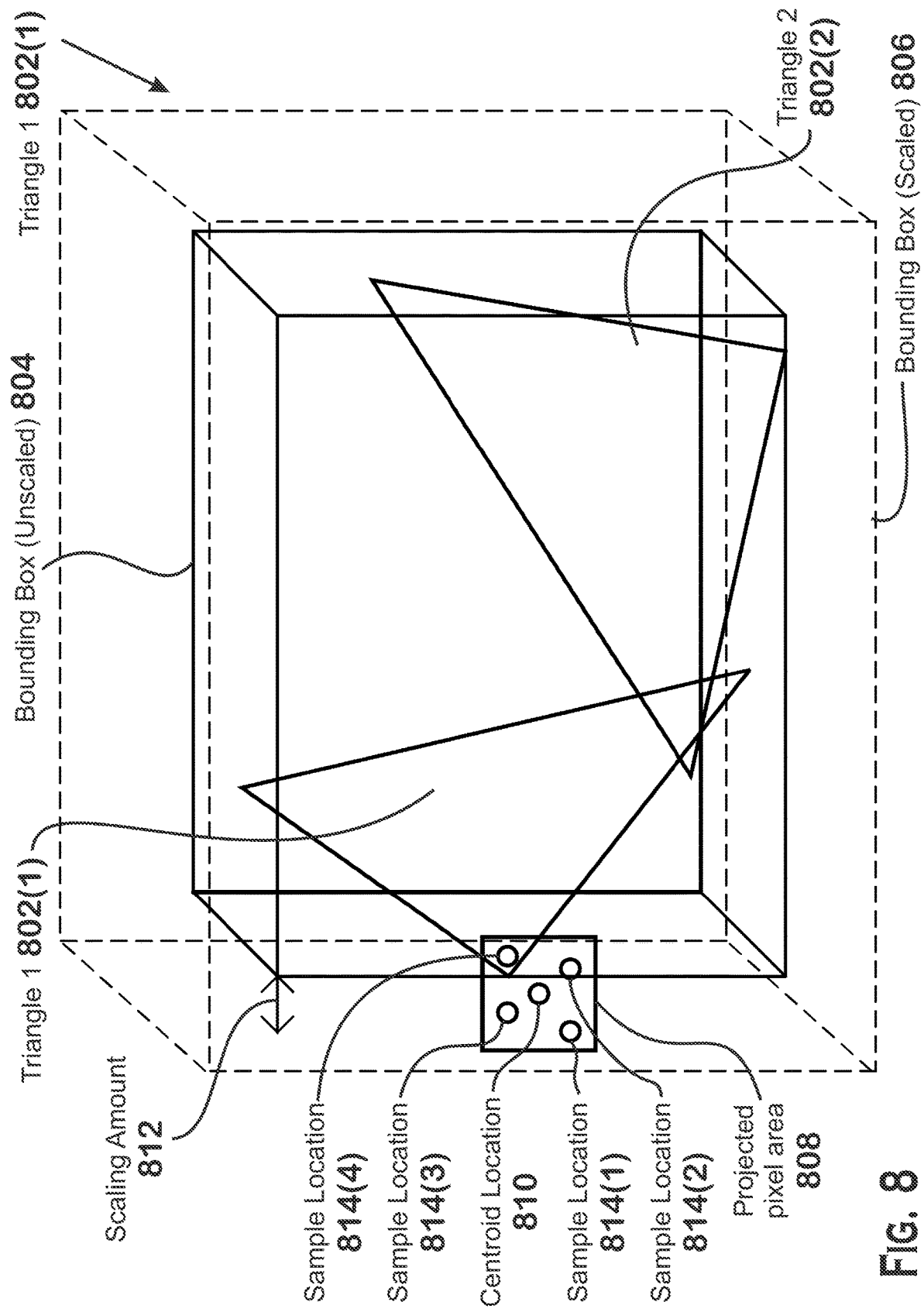
FIG. 8 illustrates an example bounding box scaling technique to address the possibility that the centroid ray falls outside a bounding box even though a sample for that centroid ray is within the bounding box.

FIG. 8 illustrates an example bounding box scaling technique to address the possibility that the centroid ray falls outside a bounding box even though a sample for that centroid ray is within the bounding box. A projected pixel area 808 is illustrated in the context of a scene 800 including two triangles 802. An unscaled bounding box 804 is illustrated. The unscaled bounding box 804 is an axis-aligned bounding box that bounds the triangles within the box. The coordinates of the box are therefore equal to the maximum positive and minimum negative extents along each axis of the coordinate system for all triangles within the box. More specifically, for each axis, the highest coordinate of the box is equal to the largest value for that axis of any triangle vertex within the box and the lowest coordinate of the box is equal to the lowest value for that axis of any triangle vertex within the box.

One issue with using the unscaled bounding box 804 for the box test (test at the non-leaf node) is that there are situations where the centroid ray will miss the box but some of the samples associated with that ray would actually intersect with a triangle in the box. In the example of FIG. 8, the centroid location 810 falls outside of the unscaled bounding box 804 but sample 814(4) intersects with triangle 1802(1).

For the above reasons, when a box test is performed during BVH traversal, the box test is performed against a scaled bounding box 806. The scaling value for the unsealed bounding box 804 is a value that is sufficient so that no centroid location will fall outside of the scaled bounding box 806 if at least one sample location 814 falls within the unsealed bounding box 804. In one example, the amount that the scaled bounding box 806 is scaled is based on the geometry of the projected pixel area 808. More specifically, a ray is cast from a ray origin towards the bounding box 804. The ray defines the axis of a cone whose outer wall is defined based on the farthest sample location from the centroid. The distance of this farthest location from the center is the radius of the cone at any particular distance from the ray origin (the radius increases with distance to ray origin). The intersection of this cone with the closest wall to the ray origin of the bounding box 804 defines the projected pixel area 808. The largest radius of this projected pixel area 808 is the scaling value that defines the amount by which the bounding box 804 is scaled in every direction. Scaling the bounding box 804 in every direction means, for each axis, adding the scaling value to the largest coordinate and subtracting the scaling value from the lowest coordinate.

It should be understood that the above test, in which a ray is tested against a bounding box is performed during BVH traversal and is performed once per ray, per bounding box in the BVH, and therefore once for multiple samples associated with a single ray, per bounding box.

It is possible to terminate traversal of a BVH early. Early termination means that the entire BVH is not fully traversed. Instead, some portions of the BVH—even portions that have not yet been eliminated due to a miss during a box test—are ignored. Early termination of a BVH for a ray occurs in response to a determination that all of a set of early termination criteria for the ray are satisfied. In an example, the early termination criteria includes that a hit is detected on an opaque triangle, and that it is guaranteed that no other triangle in the scene can be closer than the triangle for which the hit is detected. Any number of early termination criteria may be utilized to terminate BVH traversal early. In some implementations, in response to determining that early termination criteria are satisfied for each of multiple samples associated with a single ray that is cast, traversal of the BVH for the entire ray is terminated early. However, early termination is not performed where early termination criteria are satisfied for fewer than all samples associated with a ray.

As stated elsewhere herein, the results of BVH traversal and the intersection tests performed is the invocation of a particular stage of the ray tracing pipeline 300, such as the closest hit shader, the any hit shader, or the miss shader. For multi-sample ray casts, it is possible for different samples for the same ray cast to result in the invocation of different shaders, as the different samples may hit different triangles. In some implementations, invocation of a shader for multiple samples of a single ray is done by providing a coverage percentage to the shader. The coverage percentage indicates the percentage of total samples for the ray that cover the triangle that results in the invocation of the shader program. In an example, four different samples for a ray are found to trigger a closest hit shader for three different triangles. Two samples hit triangle 1, one sample hits triangle 2, and one sample hits triangle 3. The closest hit shader is invoked for triangle 1 with a 50% coverage percentage, for triangle 2 with a 25% coverage percentage, and for triangle 3 with a 25% coverage percentage.

Figure 9:
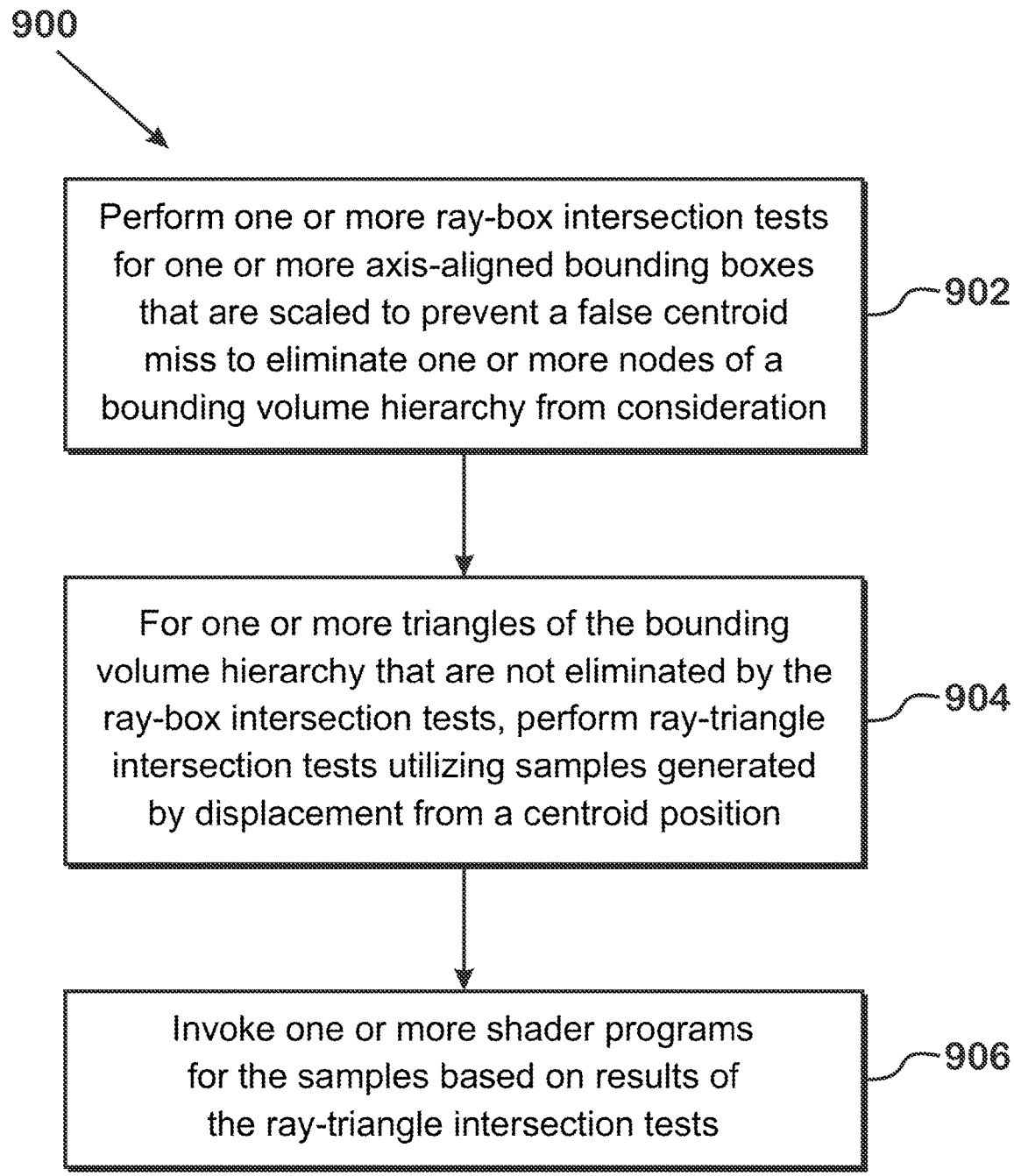
FIG. 9 is a flow diagram of a method 900 for performing a ray intersection test with a multi-sampled ray, according to an example.

FIG. 9 is a flow diagram of a method 900 for performing a ray intersection test with a multi-sampled ray, according to an example. Although described with respect to the system of FIGS. 1-8, it should be understood that any system, configured to perform the steps in any technically feasible order, falls within the scope of the present disclosure.

To initiate the method 900, a shader such as a ray generation shader of the ray generation shader stage 302 of the ray tracing pipeline 300 of FIG. 3 requests a ray intersection test be performed. At step 902, the ray intersection test unit 304 performs one or more ray-box intersection tests for one or more axis-aligned bounding boxes that are scaled to prevent a false centroid miss from occurring. A false centroid miss is a situation where the centroid ray misses the bounding box but one of the samples actually hits a triangle within the bounding box. In some examples, such scaling involves scaling the boxes based on projected pixel areas. The box tests are performed to eliminate one or more nodes of a bounding volume hierarchy from consideration.

More specifically, as illustrated in FIG. 4, a bounding volume hierarchy 404 includes non-leaf nodes ("box nodes") and leaf nodes ("triangle nodes"). Each box node represents an axis-aligned bounding box that bounds the geometry of the nodes that are descendants of that node. Each triangle node represents a triangle of the scene. The ray intersection test unit 304 tests a box node for intersection. If the ray does not intersect the box node, then the ray does not pass through the axis-aligned bounding box and all descendants of that node are eliminated from consideration. If the ray does intersect the box node, then the ray does pass through the axis-aligned bounding box and the ray intersection test unit 304 tests descendants of that node for intersection with the ray. Different implementations vary the specific order in which nodes of a BVH are examined. Tests for intersection between a ray and an axis-aligned bounding box are well-known in the art.

The box tests performed with axis-aligned bounding boxes that are scaled with respect to "true" bounding boxes for the enclosed geometry. More specifically, as described elsewhere herein, such as with respect to FIG. 8, a non-scaled axis-aligned bounding box has coordinates defined by the maximum extents of the triangles enclosed within that bounding box. A scaled axis-aligned bounding box is a bounding box that is increased in size by the size of a projected pixel area in each axis. Put differently, a scaled axis-aligned bounding box is sized such that it is not possible for the centroid ray—the ray being tested for intersection against the scaled bounding box—to miss the scaled bounding box if any of the multiple samples generated for the triangle test for that ray would intersect a triangle within the unscaled bounding box. In other words, the unscaled bounding box 804 is scaled to prevent false misses for the centroid ray from occurring, which would lead to elimination of BVH geometry from consideration in some cases where a sample actually intersects a triangle within the unscaled bounding box 804.

At step 904, the ray intersection test unit 304 tests one or more triangles of the bounding volume hierarchy that are not eliminated by the box tests for intersection with the ray. More specifically, the ray intersection test unit 304 performs a multi-sample technique in which multiple samples per ray are tested for intersection with a triangle. For the test, either the ray or the triangle vertices are offset for each sample. In addition, in different implementations, the offset occurs in world space or in the modified coordinate space after multiplication by matrix M as described elsewhere herein.

In some examples, for each particular triangle, a triangle intersection test is performed as described with respect to FIGS. 5-7. This test includes translating the vertices of the triangle to be relative to the origin of the ray and scaling and shearing the vertices of the triangle to match the coordinate system in which the ray points entirely along a single axis (e.g., in the negative z direction). In the example provided herein, this scale and shear is accomplished by multiplying the vertices of the triangle by matrix M, defined elsewhere herein. At this point, tests for intersection of the samples associated with the ray against the triangle are performed by testing whether the samples are within the triangle, in 2-dimensional space. More specifically, the z-coordinate (or whichever coordinate is non-zero for the ray) is ignored and the positions of the samples relative to the triangle vertices are used to determine whether the samples are within that triangle. The sample positions are positions that are displaced from the origin—the position corresponding to the ray centroid—based on pre-defined sample locations. If a sample is within the triangle, that sample is considered to hit the triangle and if the sample is not within the triangle, then that sample is considered to miss the triangle. In some implementations, the test for whether the sample is within the triangle is performed by obtaining barycentric coordinates for the sample position and determining whether a hit occurs based on the signs of the barycentric coordinates. In some implementations, each sample is considered to be at the origin and the triangle vertices are translated by the negative of the sample position to simplify the math for calculating the barycentric coordinates.

At step 906, the ray intersection test unit 304 invokes one or more stages of the ray tracing pipeline 300 for the samples based on the results of the ray-triangle intersection tests. In implementations where these stages are associated with shader programs, some example shader programs that are executed include a closest hit shader, an any hit shader, and a miss shader as discussed with respect to FIG. 3. For a given ray, it is possible to invoke different stages of the ray tracing pipeline 300 for different samples of the ray if the different samples intersect different triangles, if the closest hits are different for different samples, and/or if some samples do not intersect any triangles while other samples do intersect triangles.

It should be understood that steps 902, 904, and 906 may be executed in an interweaved manner for different portions of the bounding volume hierarchy. In other words, it is not necessarily the case that for a single ray, all ray-box tests are performed, and then all triangles are tested, and then all shaders are invoked. For example, it is possible to perform a depth-first search, in which the ray intersection test unit 304 traverses a portion of the BVH down to a leaf node, then back up to a box node and down a different path, and so on. It is possible to terminate BVH traversal early if early termination criteria are met for all samples of a ray. While specific early termination criteria varies by implementation, in general, BVH traversal would terminate early if the ray intersection test unit 304 is able to detect that no further useful information can be gained by traversing the remainder of the BVH.

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing a ray tracing operation for a ray, the method comprising:
    performing one or more ray-box intersection tests for the ray against one or more bounding boxes of a bounding volume hierarchy to eliminate one or more nodes of the bounding volume hierarchy from consideration;
    for one or more triangles of the bounding volume hierarchy that are not eliminated by the one or more ray-box intersection tests, performing one or more ray-triangle intersection tests for samples for a plurality of pixels of a render target, wherein, within each pixel of the plurality of pixels, multiple samples are displaced from a centroid position of the pixel; and
invoking one or more shaders of a ray tracing pipeline for the samples based on results of the ray-triangle intersection tests.

2. The method of claim 1, wherein performing the one or more ray-box intersection tests includes:
in response to determining that a first ray-box intersection test of the one or more ray-box intersection tests indicates that the ray does not intersect a scaled version of a first box associated with a non-leaf node of the bounding volume hierarchy, eliminating nodes that are descendants of the non-leaf node from consideration.

3. The method of claim 1, wherein performing the one or more ray-box intersection tests includes:
in response to determining that a first ray-box intersection test of the one or more ray-box intersection tests indicates that the ray intersects a scaled version of a first box associated with a non-leaf node of the bounding volume hierarchy, performing one or more of a ray-box intersection test and a ray-triangle intersection test for one or more nodes that are descendants of the non-leaf node.

4. The method of claim 1, wherein:
the bounding volume hierarchy includes one or more non-leaf nodes, each of which has an associated axis-aligned bounding box that bounds triangles that are children of the non-leaf nodes; and
one or more scaled axis-aligned bounding boxes are scaled to prevent a false miss from occurring for samples associated with the ray.

5. The method of claim 4, wherein the one or more scaled axis-aligned bounding boxes are scaled by increasing sizes of non-scaled axis-aligned bounding boxes by an amount that is based on a highest distance of a sample of a pixel of the plurality of pixels to a centroid of the pixel.

6. The method of claim 1, wherein the one or more ray-triangle intersection tests include determining whether the rays intersect the triangles in a modified coordinate system that comprises a coordinate system in which an origin of the ray is at an origin of the coordinate system and in which the ray travels in one axial direction and not two other axial directions.

7. The method of claim 1, wherein the samples are displaced from the centroid position within a projected pixel area that is a projection of a pixel on a triangle of the one or more triangles.

8. The method of claim 1, wherein invoking one or more shaders comprises:
in response to determining that different samples of the ray intersect different triangles of the one or more triangles, invoking different shaders for the ray.

9. The method of claim 1, further comprising:
providing a coverage percentage to at least one of the one or more shaders based on a number of samples covered for the ray.

10. The method of claim 1, wherein the one or more ray-triangle intersection tests includes determining whether the rays, displaced in world space to correspond to sample positions, intersect the triangles.

11. A system for performing a ray tracing operation for a ray, the system comprising:
a shader configured to request the ray tracing operation for the ray be performed; and
a ray intersection test unit configured to:
perform one or more ray-box intersection tests for the ray against one or more bounding boxes of a bounding volume hierarchy to eliminate one or more nodes of the bounding volume hierarchy from consideration;
for one or more triangles of the bounding volume hierarchy that are not eliminated by the one or more ray-box intersection tests, perform one or more ray-triangle intersection tests for samples for a plurality of pixels of a render target, wherein, within each pixel of the plurality of pixels, multiple samples are displaced from a centroid position of the pixel; and
invoke one or more shaders of a ray tracing pipeline for the samples based on results of the ray-triangle intersection tests.

12. The system of claim 11, wherein performing the one or more ray-box intersection tests includes:
in response to determining that a first ray-box intersection test of the one or more ray-box intersection tests indicates that the ray does not intersect a scaled version of a first box associated with a non-leaf node of the bounding volume hierarchy, eliminating nodes that are descendants of the non-leaf node from consideration.

13. The system of claim 11, wherein performing the one or more ray-box intersection tests includes:
in response to determining that a first ray-box intersection test of the one or more ray-box intersection tests indicates that the ray intersects a scaled version of a first box associated with a non-leaf node of the bounding volume hierarchy, performing one or more of a ray-box intersection test and a ray-triangle intersection test for one or more nodes that are descendants of the non-leaf node.

14. The system of claim 11, wherein:
the bounding volume hierarchy includes one or more non-leaf nodes, each of which has an associated axis-aligned bounding box that bounds triangles that are children of the non-leaf nodes; and
one or more scaled axis-aligned bounding boxes are scaled to prevent a false miss from occurring for samples associated with the ray.

15. The system of claim 14, wherein the one or more scaled axis-aligned bounding boxes are scaled by increasing sizes of non-scaled axis-aligned bounding boxes by an amount that is based on a highest distance of a sample of a pixel of the plurality of pixels to a centroid of the pixel.

16. The system of claim 11, wherein the one or more ray-triangle intersection tests include determining whether the rays intersect the triangles in a modified coordinate system that comprises a coordinate system in which an origin of the ray is at an origin of the coordinate system and in which the ray travels in one axial direction and not two other axial directions.

17. The system of claim 11, wherein the samples are displaced from the centroid position within a projected pixel area that is a projection of a pixel on a triangle of the one or more triangles.

18. The system of claim 11, wherein invoking one or more shaders comprises:
in response to determining that different samples of the ray intersect different triangles of the one or more triangles, invoking different shaders for the ray.

19. The system of claim 11, wherein the ray intersection test unit is further configured to:
provide a coverage percentage to at least one of the one or more shaders based on a number of samples covered for the ray.

20. The system of claim 11, wherein the one or more ray-triangle intersection tests includes determining whether the rays, displaced in world space to correspond to sample positions, intersect the triangles.

21. A non-transitory computer-readable medium storing instructions that, when executed by a processor, cause the processor to perform a ray tracing operation for a ray, by:
performing one or more ray-box intersection tests for the ray against one or more bounding boxes of a bounding volume hierarchy to eliminate one or more nodes of the bounding volume hierarchy from consideration;
for one or more triangles of the bounding volume hierarchy that are not eliminated by the one or more ray-box intersection tests, performing one or more ray-triangle intersection tests for samples for a plurality of pixels of a render target, wherein, within each pixel of the plurality of pixels, multiple samples are displaced from a centroid position of the pixel; and
invoking one or more shaders of a ray tracing pipeline for the samples based on results of the ray-triangle intersection tests.

22. The non-transitory computer-readable medium of claim 21, wherein performing the one or more ray-box intersection tests includes:
in response to determining that a first ray-box intersection test of the one or more ray-box intersection tests indicates that the ray does not intersect a scaled version of a first box associated with a non-leaf node of the bounding volume hierarchy, eliminating nodes that are descendants of the non-leaf node from consideration.

* * * * *